Figure 3:
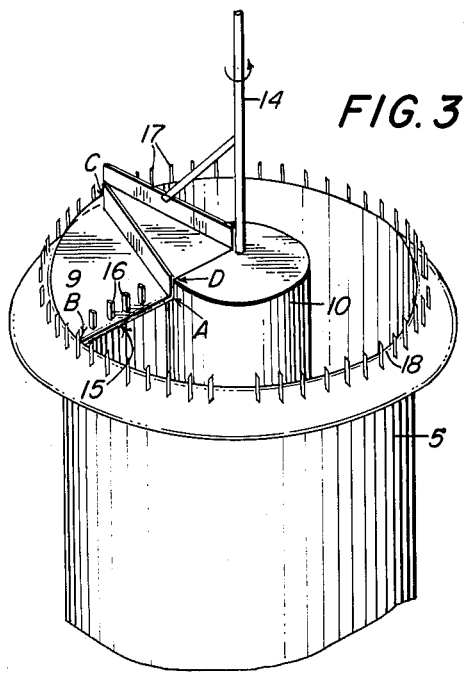

Oct. 12, 1965 L. RADEMA ETAL 3,210,845
APPARATUS FOR THE CONTINUOUS MANUFACTURE OF CURD
Original Filed July 10, 1961 2 Sheets-Sheet 1
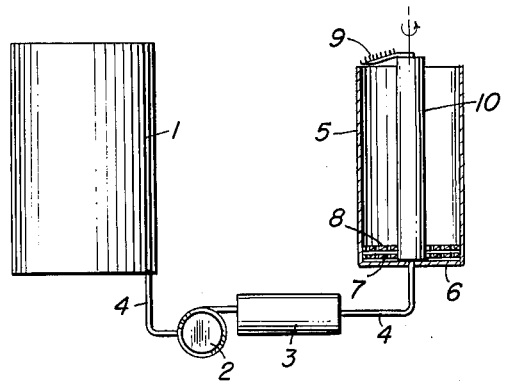
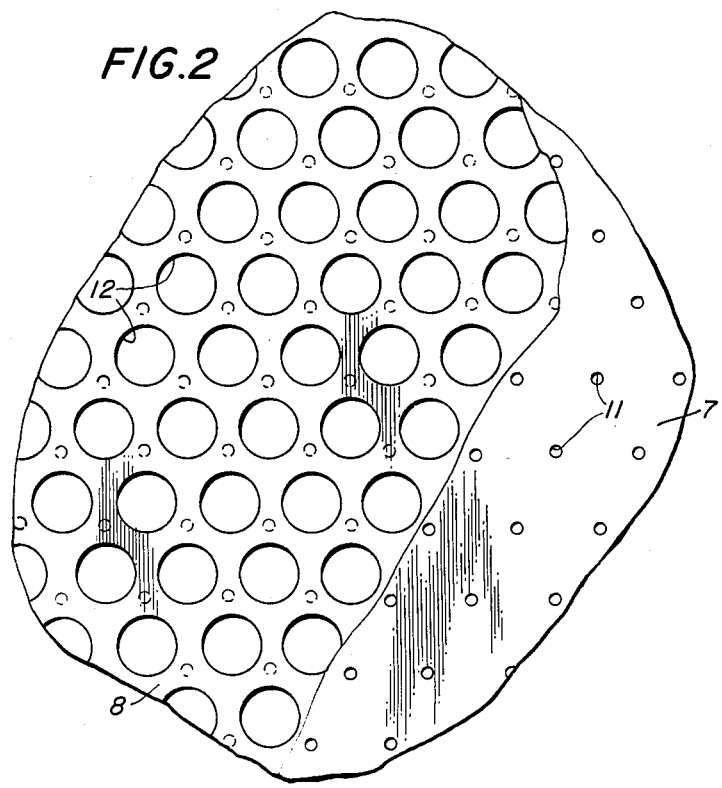
INVENTORS
LAMBERTUS RADEMA
JACOB UBBELS
ADRIAAN G.J. ARENTZEN AND
JOHAN T. VAN DER LINDE
BY Hammond & Littell
ATTORNEYS Oct. 12, 1965   L. RADEMA ETAL   3,210,845
APPARATUS FOR THE CONTINUOUS MANUFACTURE OF CURD
Original Filed July 10, 1961   2 Sheets-Sheet 2

INVENTORS
LAMBERTUS RADEMA
JACOB UBBELS
ADRIAAN G. J. ARENTZEN AND
JOHAN T. VAN DER LINDE
BY *Hammond + Littell*
ATTORNEYS

United States Patent Office 3,210,845
Patented Oct. 12, 1965

3,210,845
APPARATUS FOR THE CONTINUOUS
MANUFACTURE OF CURD
Lambertus Radema and Jacob Ubbels, Ede, Adriaan G. J. Arentzen, Amersfoort, and Johan T. van der Linde, Ede, Netherlands, assignors, by mesne assignments, to Bedrijven van het Nederlands Instituut voor Zuivelonderzoek, Ede, Netherlands, an institution of the Netherlands
Original application July 10, 1961, Ser. No. 122,690, now Patent No. 3,132,026, dated May 5, 1964. Divided and this application Sept. 7, 1962, Ser. No. 227,103
Claims priority, application Netherlands, July 11, 1960, 253,654
3 Claims. (Cl. 31—46)

This is a division of application Serial No. 122,690, filed July 10, 1961, now Patent No. 3,132,026, issued May 5, 1964.

The invention relates to a apparatus for the continuous manufacture of curd by adding to cooled milk the required quantity of rennet, keeping the mixture for some time in that temperature range, and subsequently heating it.

Recently there has been a tendency to mechanize the manufacture of cheese and to carry it out in a continuous process. A particularly important part of such a process is the production of the curd, especially the cut curd.

One of the difficulties involved is, that the curd becomes available batchwise, while the further apparatus for the manufacture of cheese should preferably operate continuously. As the quantity becoming available cannot be processed rapidly enough, it is difficult to get a homogeneous product in this way. A resolution of this problem might be a reduction of the ratio between the capacity of the cheese tank and the capacity of the said further apparatus for the manufacture of cheese. Another resolution might be to carry out the coagulation process itself continuously. This later method was suggested in the U.S. Patent No. 2,781,269. However, the process has the disadvantages of (1) requiring a large tube for the coagulation to take place in, (2) of having a short mixing time which does not guarantee a homogeneous product, (3) of requiring a long time to dampen the turbulence and (4) of not being able to uniformly cut the curd.

According to Nature 149, 194 (1942) the clotting of milk caused by the addition of rennet may be divided into two phases, viz, one enzymic and one non-enzymic. Now the temperature coefficient of the first phase was found to be much smaller than that of the second phase.

Now, it was found that the difference in temperature coefficient between the two phases may be utilized for the continuous production of curd. According to the invention rennet, starter, and other ingredients required for the production of cheese are added to the milk that has been cooled down to a temperature of −1° C. to +15° C., and after being kept at said temeprature for 1½–48 hours, this mixture is passed firstly through a heat exchanger, in which it is heated to 20–45° C., and then through a coagulation chamber, which near the inlet-opening of the feed pipe comprises a device for preventing turbulences in the liquid mass and the outlet opening may be equipped with an apparatus for cutting the curd.

Since during the first phase the consistency of the milk does not change and no flocculation takes place as yet, the milk may still be made to flow, be pumped, or be mixed as desired, without any detrimental consequences. It is thus possible to mix the commonly used additions very thoroughly with the milk, during the whole cold storage period, if desired. This promotes the homogeneity of the product. The mixing process preferably takes place with the exclusion of air. Indeed, large amounts of air may dissolve in cold milk, and this air will be liberated again during the heating process. It may be occluded by the clotting casein and may afterwards cause the curd to float in the whey and may produce air occlusions in the cheese.

The circumstance that the clotting time becomes only slightly shorter if after the completion of the first phase the milk is still stored at the low temperature enables that the heaing of the curd does not have to take place immediately after the completion of the first phase. This implies in the first place that if the milk is fed continuously to an apparatus in which the first phase is completed, the time during which the milk remains in said apparatus above a given minimum is not tied down to narrow limits, so that the control of this part of the process presents few difficulties. Secondly this even enables one to carry out the first phase discontinuously in tanks. In that case the temperature of the milk should be adjusted so that after the simple addition and mixing of the commonly used ingredients the end-point of the first phase is indeed reached, but that the clotting time decreases only within a permissible range during the period in which the liquid from the tank is processed further.

The method at which the reaction of the first phase takes place in tanks instead of in a heat exchanger greatly promotes the homogeneity. In this way the dosage of the additions and the temperature-control are simple.

The apparatus for carrying out the process comprises connected in sequence means for cooling, mixing and holding of the milk and added ingredients, pumping means, means for warming the milk mixture to coagulating temperature, and a coagulation chamber with means at its inlet end for rapidly changing the turbulent stream of warmed milk into an undisturbed and slowly moving stream of coagulating milk at uniform speed and with means at its outlet end for cutting the slowly moving stream of curd.

In the heat exchanger the mass is heated to the clotting temperature and subsequently flows into the coagulation chamber, in which, moving slowly, it completes the second phase. The time interval between the beginning of the heating process and the moment at which the milk in the coagulation chamber is moving uniformly with an equal and similarly directed velocity has to be so short that no perceptible clotting occurs during this time interval. Indeed, turbulences of the clotting milk are most undesirable; they give rise to the dreaded curd dust as well as to losses of fats and proteins.

Preferably the process is started with milk having a temperature of 3–6° C., and after addition of the rennet, starter, and the further ingredients the mass is kept at said temperature for another 2–6 hours.

The heat exchanger used may consist of a conduit or tube heated by steam or some other heating medium, but preferably a tubular or a plate heat exchanger is used. The most favourable temperature for the coagulation in the coagulation chamber is 29–30° C.

The cut curd thus obtained may further be converted into cheese.

Figure 4:
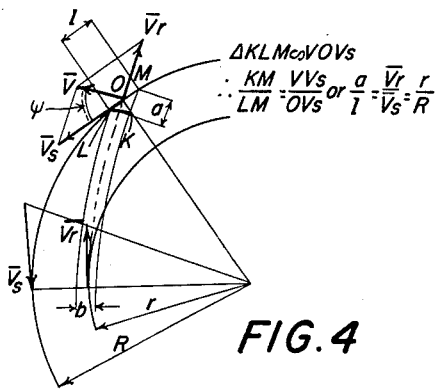
Figure 5:
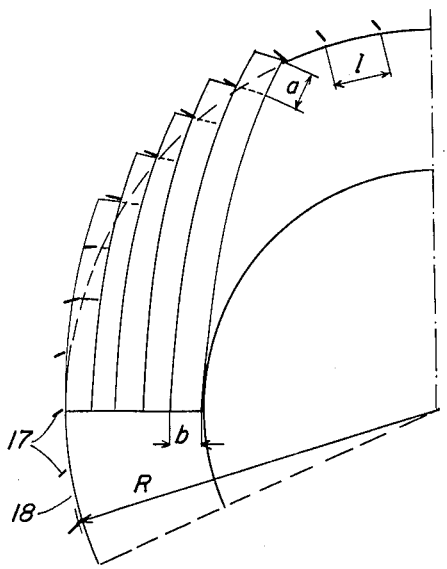

Referring now to the drawings:
FIG. 1 is a diagrammatic side elevation of a suitable apparatus for the continuous production of curd.
FIG. 2 is a partial fragmentary view of perforated discs 7 and 8 with respective openings 11 and 12.
FIG. 3 is a perspective view of the upper part of the coagulation chamber 5 illustrating the cutting means 9.
FIG. 4 is an auxiliary drawing to derive the proper position in which the cutting means are to be placed to cut and remove curd outwardly.
FIG. 5 is a diagrammatic drawing of the curd strips formed by the cutting means.

In FIG. 1, "1" denotes a tank in which the cold milk is stored and the required addition is made of rennet and other substances used in making cheese curd such as calcium chloride, saltpetre, starter culture and/or coloring agent. The said ingredients are thoroughly mixed therein by stirring. After the desired reaction period, the mixture is pumped by pump 2 via lines 4 through heat exchanger 3 into the inlet opening in the center of bottom plate 6 of coagulation chamber 5. At a very short distance above bottom plate 6, the flow of milk is interrupted by two perforated discs 7 and 8 whose respective perforations 11 and 12 are staggered as shown in FIG. 2 whereby the flow of coagulating milk becomes slow and uniform to the top of the coagulation chamber 5. In the center of the coagulation chamber 5 is a smaller cylinder 10 which extends above the top of the coagulation chamber. Attached to the upper end of cylinder 10 is the cutting apparatus 9 which rotates in the direction of the arrow.

FIG. 2 illustrates the size and staggered position of the respective perforations 11 and 12 in discs 7 and 8. The size and number of the perforations 11 in lower disc 7 are such that a pressure is set up beneath this disc which is large in relation to the pressure losses caused by friction of the warmed milk between disc 7 and bottom plate 6. Suitable perforations would be fifty 1 mm. diameter perforations per 100 cm.² of disc 7. This ensures that the quantity of milk flowing through each of the perforations of disc 7 is about equal. The upper disc 8 contains an equal number of perforations 12 in the same pattern but they are much larger, i.e., fifty 10 mm. diameter perforations per 100 cm.² and are staggered with respect to the perforations 11 of the lower disc 7. The upper disc 8 prevents any secondary flow in the coagulating milk.

FIG. 3 illustrates the cutting means 9 of FIG. 1 which is rotated about cylinder 10 by rotating shaft 14 so that cutting edge 15 and vertical blades 16 cut the curd into strips. The knife 9 is part of a sector of a circle and has been mounted in such a way that the cutting edge 15 or AB forms a small angle with the plane through the upper edge 18 of cylinder 5, so that point A lies higher than point B. The cutting surface ABC of the rotating knife may remain just inside the wall of the cylinder, or it may overlap the wall of the cylinder as shown. The circular edge BC of the knife is inclined upwards in a helix in such a way that the underside of the plate ABC remains free of the continuously rising surface of the coagulated milk. The strips of curd formed by means of the cutting edge 15 and blades 16 slide over plate ABC in a way which is illustrated diagrammatically in FIG. 5. Thus, they remain intact, but are straightened out. If AB were horizontal, the innermost strip would brush against the wall CAD (the radius of curvature of wall CAD being larger than the curvature of the inner cylinder) and at the same time would have to go up the slope of plate ABC (for C lies higher than A and B). Actually, as already mentioned above, A lies higher than B, so that the slope up which the central strip has to go is smaller. Another object thus attained is that the cut strips will tend to slide off sideways, in consequence of which the pressure of the innermost strip against the wall CAD, among other things, will diminish. At an adequate slope of AB, the innermost strip may even be free from this wall. The firmness of the cut strips also plays a part in this. The less firm the strips, the more readily they tend to slide off sideways with the same position of plate ABC.

The position of plate ABC is preferably adjusted in such a way that the strips only just do not slide off sideways. As they arrive at the edge of the outer cylinder the strips are cut up by the vertical blades 17. Since all the strips are cut into $n$ pieces with each revolution of the cutting apparatus if there are $n$ blades on the circumference of the upper edge 18, the volume of a piece from the strip originally lying at a distance $r$ from the center as in FIG. 4, the width of the strip being $b$ and its height $h$, is equal to $$\frac{2\pi rhb}{n}$$

If care is taken that $rb$ is constant, the volume of all the pieces formed will be equal. The shape of the pieces is mainly determined by the movement of the strips relative to the blades 17.

In FIG. 4 the construction is stated of the speed $\overline{V}$ of a strip of curd, relative to the knives 17 of the upper edge 18 of cylinder 5. If $\overline{V}_s$ is the speed of the rotating cutting apparatus at the outer cylinder, that is, on radius R, one may construct the speed $\overline{V}_r$ in respect of the cutting apparatus of a strip on radius $r$. Then $$\frac{\overline{V}_r}{\overline{V}_s} = \frac{r}{R}$$

At its movement over the plate of the cutting apparatus the strip will maintain this speed $V_r$. The direction of $V_r$ in respect to the moving apparatus at the moment this strip meets the edge 18 of the outer cylinder 5 is the direction of the tangent to the centerline of the strip, provided that the strip does not slide down sidelongly. In that point the rotating cutting apparatus still has a speed $\overline{V}_s$ relative to the outer cylinder edge 18. Thus the speed of the strip in respect to the knives 14 on the edge of the outer cylinder is that indicated by the vector sum $\overline{V}$ of $\overline{V}_s$ and $\overline{V}_r$. The angle $\psi$ between $\overline{V}$ and $\overline{V}_s$ is at a given form of the wall CAD (vide FIG. 3) depending on the ratio $r/R$. The position of the vertical knives 17 (vide FIG. 5) is fixed so that they make an angle with $\overline{V}_s$ approximating the mean value of $\psi$.

FIG. 5 shows the position of the blades 17 as well as the shape of the lumps into which the strips are divided. FIGS. 4 and 5 also show the length $a$ of the lumps into which a strip is divided by the blades 17 at intervals of $l$. From the similarity of triangles it follows that $$\frac{a}{l} = \frac{r}{R}$$

The volume of a lump is equal to $abh$ if $h$ is the height of the strip. And since $abh = hbr_R^1$, all the lumps obtained have the same volume if $br$ is constant. The distance between the blades 16 is thus inversely proportional to the distance of the blades from the centre. The minimum distance between the blades 17, i.e. between the "outer" blades, is about 0.5 cm. The maximum distance is preferably chosen no greater than 4 cm.

The gradient of AB may in general be between 0° and 60°, but preferably between 5° and 10°, e.g. 7°. The pitch of the curved line BC is determined only by the speed of the cutting apparatus and the rising rate of the coagulated milk. In fact, the underside of the plate ABC should always remain free of the rising surface of the coagulated milk. The shape of the wall CAD may vary widely; in fact, it may curve "forward," or be plane, or curve "backward," both vertically and in a diverging direction. If the gradient of AB is sufficient, the wall CAD may even be omitted altogether. In FIG. 3 the cutting edge AB lies in a plane through the shaft of cylinders 5 and 10. This of course is not necessary.

In the construction described above the cut curd is removed outwards. It is, however, also possible to remove the curd inwards, i.e. towards the inner cylinder. A combination of the two methods is of course also possible and presents possibilities especially when the distance between the inner and the outer cylinder is large.

The side AD of the raised part of the knife rotates as close to the inner cylinder 10 as possible. This inner cylinder has been provided in order to prevent the cutting speed of the cutting edges relative to the coagulated curd becoming too slow. Too slow a cutting speed gives rise to all sorts of difficulties, such as curling-up in front of the knife, poor removal from the knife, and the like.

The cut curd obtained in the above way may be warmed a few degrees higher to accelerate the syneresis.

The minimum distance between the cylinders 5 and 10 is 1 to 2 cm., the maximum distance is theoretically unlimited, but in practice will not exceed 100 cm.

The minimum diameter of the inner cylinder 10 is 0 cm., i.e. this cylinder may be omitted, if desired; the maximum diameter is not tied down to any limits, but should always be smaller than the diameter of the outer cylinder 5.

In the above description the reference was invariably to an annular coagulation chamber. Another form may also be used, provided the coagulation process is not adversely affected by it. A slit-shaped coagulation chamber makes it possible to use a reciprocating cutting apparatus, and this is attractive indeed from the point of view of cutting technique.

In general all the blades should be as thin and sharp as possible. The maximum thickness might be put at 5 mm. Blades of 0.5 mm. and sheet steel of 1 mm. for the surface ABC are suitable in practice.

*Example I*

In a tank, pasteurized milk was stored at a temperature of 3° C. To this milk the following ingredients were added: 6%° (by volume) of starter, 0.3%° (by vol.) of rennet, 0.3%° (by vol.) of $CaCl_2$, 0.2%° (by weight) by $KNO_3$.

Five hours after the addition of rennet and starter, the milk was begun to be pumped from the tank and to be forced through a plate-heat exchanger to the coagulation chamber. The milk was heated to 30° C. in the heat exchanger. Within 14 minutes after the temperature of 30° C. had been reached the milk had risen to the top of the coagulation chamber (height more than 1 m.), where it had a consistency such that it could be cut. The curd particles thus formed were regularly shaped and were converted into cheese.

*Example II*

The treatment of the milk in the storage tank was the same as in Example I. In the heat exchanger the milk was now heated to 32° C. instead of 30° C. At this coagulation temperature the milk after 6 minutes already had a consistency such that it could be cut and converted into cheese. In this case the height of the coagulation chamber could be less than, e.g. 1 m., and amounted to about 0.5 m.

*Example III*

In a tank, pasteurized whole milk was stored at a temperature of 3° C. The same ingredients as in Example I were added to this milk.

After the rennet and the starter had acted on the milk for 36 hours, the milk was begun to be pumped from the tank and to be forced through the plate heat exchanger to the coagulation chamber. The milk was heated in the heat exchanger to 29-30° C. Within 14 minutes after the coagulation temperature had been reached the mlik rose to the top of the coagulation chamber (height more than 1 m.), where it could be cut. The cut curd was converted into cheese.

What we claim is:

1. An apparatus for the manufacture of curd comprising means for storing and mixing cold milk with rennet and starter, pumping means connected with the storing means for mixing and moving the mixture therefrom to a means for warming the milk mixture to coagulating temperature and an open top coagulation chamber vertically disposed with a bottom inlet with at least two vertically spaced upper and lower perforated discs positioned near the bottom portion thereof with staggered perforations therein to dampen the turbulence of the milk stream, said perforations being larger in the upper disc and cutting means at the top portion of the coagulation chamber for cutting the slowly moving stream and curd.

2. The apparatus of claim 1 wherein the lower perforated disc contains about fifty 1 mm. diameter perforations per 100 $cm.^2$ and the upper perforated disc contains about fifty 10 mm. diameter perforations per 100 $cm.^2$.

3. The apparatus of claim 1 wherein the cutting means comprises a sector-shaped cutter sloping upwards in a helical plane, substantially vertical blades at the cutting edge of the sector shaped cutter whose cutting surfaces are on the same side as the cutting edge and substantially vertical blades on the circumference of the coagulation chamber whose cutting surfaces are directed into the coagulation chamber.

References Cited by the Examiner

UNITED STATES PATENTS 2,717,212   9/55   Hensgen et al.
2,908,575  10/59   Spiess et al. _____ 31—46 X
2,917,827  12/59   Lankford _____ 31—46

SAMUEL KOREN, *Primary Examiner.*

CARL W. ROBINSON, HUGH R. CHAMBLEE, *Examiners.*